United States Patent
Yi et al.

(10) Patent No.: US 8,243,931 B2
(45) Date of Patent: Aug. 14, 2012

(54) METHOD FOR DETECTING SECURITY ERROR IN MOBILE TELECOMMUNICATIONS SYSTEM AND DEVICE OF MOBILE TELECOMMUNICATIONS

(75) Inventors: Seung-June Yi, Gyeonggi-Do (KR); Sung-Jun Park, Gyeonggi-Do (KR); Young-Dae Lee, Gyeonggi-Do (KR); Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 268 days.

(21) Appl. No.: 12/667,860

(22) PCT Filed: Aug. 4, 2008

(86) PCT No.: PCT/KR2008/004514
§ 371 (c)(1),
(2), (4) Date: Jan. 22, 2010

(87) PCT Pub. No.: WO2009/022803
PCT Pub. Date: Feb. 19, 2009

(65) Prior Publication Data
US 2011/0263221 A1    Oct. 27, 2011

Related U.S. Application Data

(60) Provisional application No. 60/955,040, filed on Aug. 10, 2007.

(30) Foreign Application Priority Data

Jul. 23, 2008 (KR) .................. 10-2008-0071933

(51) Int. Cl.
*H04K 1/00* (2006.01)
*H04L 9/00* (2006.01)

(52) U.S. Cl. .................. 380/270; 713/168; 713/170
(58) Field of Classification Search .................. 380/270; 713/150, 160–163, 167–171, 181; 726/2–3, 726/11–14
See application file for complete search history.

(56) References Cited

U.S. PATENT DOCUMENTS 5,878,041 A    3/1999    Yamanaka et al.
(Continued)

FOREIGN PATENT DOCUMENTS

EP    1343267 A2    9/2003
(Continued)

OTHER PUBLICATIONS

Kashima, T., "Method and Apparatus for Providing Timing Alignment", U.S. Appl. No. 60/944,662, Jun. 18, 2007.
(Continued)

*Primary Examiner* — Hosuk Song
(74) *Attorney, Agent, or Firm* — Lee, Hong, Degerman, Kang & Waimey

(57) ABSTRACT

A method and apparatus for detecting a security error at a PDCP layer of an LTE (Long Term Evolution) system, a mobile communication system, are disclosed.
Conditions for determining a security failure are defined. A receiving side PDCP layer determines whether HFN de-synchronization, namely, a security failure, has occurred by using particular conditions (namely, conditions for determining the security failure). If it is determined that the security failure has occurred, the receiving side PDCP layer informs an RRC layer to re-establish an RB or perform a PDCP RESET procedure to re-set security configuration of a transmitting side and the receiving side.

13 Claims, 9 Drawing Sheets

U.S. PATENT DOCUMENTS

| | | |
|---|---|---|
| 6,445,917 B1 | 9/2002 | Bark et al. |
| 6,594,240 B1 | 7/2003 | Chuah et al. |
| 6,728,918 B1 | 4/2004 | Ikeda et al. |
| 7,171,163 B2 | 1/2007 | Terry et al. |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,710,930 B2 | 5/2010 | Kwak |
| 7,817,595 B2 | 10/2010 | Wu |
| 7,876,771 B2 | 1/2011 | Bergstrom et al. |
| 7,978,616 B2 | 7/2011 | Chun et al. |
| 8,027,363 B2 | 9/2011 | Chun et al. |
| 8,059,597 B2 | 11/2011 | Park et al. |
| 8,081,662 B2 | 12/2011 | Chun et al. |
| 8,130,687 B2 | 3/2012 | Cai et al. |
| 2002/0001314 A1 | 1/2002 | Yi et al. |
| 2002/0009999 A1 | 1/2002 | Lee et al. |
| 2002/0122411 A1 | 9/2002 | Zimmerman et al. |
| 2003/0007490 A1 | 1/2003 | Yi et al. |
| 2003/0194992 A1 | 10/2003 | Kim et al. |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0156330 A1 | 8/2004 | Yi et al. |
| 2004/0184438 A1 | 9/2004 | Terry |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0096017 A1 | 5/2005 | Kim |
| 2005/0118992 A1 | 6/2005 | Jeong et al. |
| 2005/0192021 A1 | 9/2005 | Lee et al. |
| 2005/0193309 A1 | 9/2005 | Grilli et al. |
| 2005/0237932 A1 | 10/2005 | Liu |
| 2005/0238051 A1 | 10/2005 | Yi et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2006/0067238 A1 | 3/2006 | Olsson et al. |
| 2006/0067289 A1 | 3/2006 | Lee et al. |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154680 A1 | 7/2006 | Kroth et al. |
| 2006/0165045 A1 | 7/2006 | Kim et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0280145 A1 | 12/2006 | Revel et al. |
| 2007/0060139 A1 | 3/2007 | Kim et al. |
| 2007/0079207 A1 | 4/2007 | Seidel et al. |
| 2007/0081513 A1 | 4/2007 | Torsner |
| 2007/0091810 A1 | 4/2007 | Kim et al. |
| 2007/0183358 A1 | 8/2007 | Cai |
| 2007/0189205 A1 | 8/2007 | Terry et al. |
| 2007/0201397 A1 | 8/2007 | Zhang |
| 2007/0268861 A1 | 11/2007 | Diachina et al. |
| 2007/0274278 A1 | 11/2007 | Choi et al. |
| 2007/0297367 A1* | 12/2007 | Wang et al. ............ 370/331 |
| 2008/0043658 A1 | 2/2008 | Worrall |
| 2008/0051098 A1 | 2/2008 | Rao |
| 2008/0059859 A1 | 3/2008 | Marinier et al. |
| 2008/0165717 A1 | 7/2008 | Chen et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0233941 A1 | 9/2008 | Jen |
| 2008/0268878 A1 | 10/2008 | Wang et al. |
| 2008/0273482 A1 | 11/2008 | Lee et al. |
| 2008/0318578 A1 | 12/2008 | Worrall |
| 2009/0016301 A1 | 1/2009 | Sammour et al. |
| 2009/0104890 A1 | 4/2009 | Wang et al. |
| 2009/0175163 A1 | 7/2009 | Sammour et al. |
| 2010/0128648 A1 | 5/2010 | Lee et al. |
| 2010/0232335 A1 | 9/2010 | Lee et al. |
| 2011/0019604 A1 | 1/2011 | Chun et al. |

FOREIGN PATENT DOCUMENTS

| | | |
|---|---|---|
| EP | 1508992 | 2/2005 |
| EP | 1689130 | 8/2006 |
| EP | 1768297 | 3/2007 |
| EP | 1796405 | 6/2007 |
| JP | 2003-018050 | 1/2003 |
| JP | 2003-283592 | 10/2003 |
| JP | 2006-054718 | 2/2006 |
| JP | 2006-514466 | 4/2006 |
| KR | 1020010045783 | 6/2001 |
| KR | 1020010062306 | 7/2001 |
| KR | 1020020004645 | 1/2002 |
| KR | 10-2002-0097304 A | 12/2002 |
| KR | 10-2003-0012048 A | 2/2003 |
| KR | 1020030060055 | 7/2003 |
| KR | 1020030087914 | 11/2003 |
| KR | 1020040034398 | 4/2004 |
| KR | 1020040039944 | 5/2004 |
| KR | 10-2004-0072961 | 8/2004 |
| KR | 1020050022988 | 3/2005 |
| KR | 10-2005-0081836 | 8/2005 |
| KR | 10-2005-0099472 | 10/2005 |
| KR | 1020050100882 | 10/2005 |
| KR | 1020050103127 | 10/2005 |
| KR | 1020060004935 | 1/2006 |
| KR | 10-2006-0014910 | 2/2006 |
| KR | 10-2006-0029452 | 4/2006 |
| KR | 1020060042858 | 5/2006 |
| KR | 1020060069378 | 6/2006 |
| KR | 1020060079784 | 7/2006 |
| KR | 1020060090191 | 8/2006 |
| KR | 1020060134058 | 12/2006 |
| KR | 1020070048552 | 5/2007 |
| KR | 10-2007-0076374 | 7/2007 |
| WO | 2004/042963 | 5/2004 |
| WO | 2005/039108 | 4/2005 |
| WO | 2006/052086 | 5/2006 |
| WO | 2006/116620 | 11/2006 |
| WO | 2007/024065 | 3/2007 |
| WO | 2007/039023 | 4/2007 |
| WO | 2007/052900 | 5/2007 |
| WO | 2007/078155 | 7/2007 |
| WO | 2007/078173 | 7/2007 |
| WO | 2007/078174 | 7/2007 |
| WO | 2007/089797 | 8/2007 |
| WO | 2007/126793 | 11/2007 |
| WO | 2007/147431 | 12/2007 |

OTHER PUBLICATIONS

Lin, L.C., "Enhanced Random Access Response Formats in E-UTRA", U.S. Appl. No. 61/006,348, Jan. 8, 2008.

Nokia. "Buffer Reporting for E-UTRAN," R2-060829, 3GPP TSG-RAN WG2 Meeting #52, Mar. 2006, XP-002503218.

Nokia, "Uplink Scheduling for VoIP," R2-070476, 3GPP TSG-RAN WG2 Meeting #57, Feb. 2007, XP-008125208.

NEC, "Optimized Buffer Status Reporting," R2-072515, 3GPP TSG-RAN WG2 #58bis Meeting, Jun. 2007, XP-002503220.

Catt et al., "Consideration on UL Buffer Reporting," R2-062934, 3GPP TSG RAN WG2 #55, Oct. 2006, XP-002513924.

Wang, P.S., et al., "Operation of Control Protocol Data Units in Packet Data Convergence Protocol", U.S. Appl. No. 60/976,139, Sep. 28, 2007.

Mukherjee, R.P., et al., "Method and Apparatus of Performing Packet Data Convergence Protocol Reset", U.S. Appl. No. 61/019,058, Jan. 4, 2008.

ZTE, "Redundant Retransmission Restraint in RLC-AM," R2-061234, 3GPP TSG RAN WG2 Meeting #53, May 2006, XP-050131180.

European Telecommunications Standards Institute (ETSI), "Digital Cellular Telecommunications System (Phase 2+): Functional Stage 2 Description of Location Services (LCS) in GERAN (Release 7)," ETSI TS 143 059, v7.3.0. May 2007, XP-014038519.

LG Electronics Inc., "UE State Transition in LTE_ACTIVE," R2-061002, 3GPP TSG-RAN WG2 #52, Mar. 2006, XP-050130928.

Texas Instruments, "UL Synchronization Management and Maintenance in E-UTRA," R1-072198, 3GPP TSG RAN WG1 #49, May 2007, XP-050105936.

Texas Instruments, "UL Synchronization Management in LTE_ACTIVE," R1-071478, 3GPP TSG RAN WG1 #48bis, Mar. 2007, XP-050105413.

Motorola, "Contention-free Intra-LTE Handover," R2-070730, 3GPP TSG-RAN WG2 #57, Feb. 2007, XP-050133763.

Ericsson, "Scheduling Request in E-UTRAN," R1-070471, 3GPP TSG-RAN WG2 #47bis, Jan. 2007, XP-050104502.

Cohen, "An Improved SSCOP-like Scheme for Avoiding Unnecessary Retransmissions and Achieving Ideal Throughput," Proceedings of IEEE Infocom Conference on Computer Communications, pp. 855-862, Mar. 1996, XP-010158150.

ASUSTeK, "On-line recovery of HFN synchronization due to RLC UM SN problem", R2-041940, 3GPP TSG-RAN WG2 meeting #44, Oct. 2004.

Rapporteur (ASUSTeK), "Summary of HFN de-synchronization problem off-line email discussion", R2-050318, 3GPP TSG RAN WG2 #46, Feb. 2005.

Amitava Ghosh et al., "Random Access Design for UMTS Air-Interface Evolution", pp. 1041-1045, Apr. 2007.

* cited by examiner

METHOD FOR DETECTING SECURITY ERROR IN MOBILE TELECOMMUNICATIONS SYSTEM AND DEVICE OF MOBILE TELECOMMUNICATIONS

CROSS-REFERENCE TO RELATED APPLICATIONS

This application is a national stage application of PCT/KR2008/004514 filed on Aug. 4, 2008, which claims the benefit of earlier filing date and right of priority to Korean Application No. 10-2008-0071933, filed on Jul. 23, 2008 and U.S. Provisional Application No. 60/955,040 filed on Aug. 10, 2007, the contents of which are hereby incorporated by reference herein in their entirety.

TECHNICAL FIELD

The present invention relates to a method and device for detecting a security error in a security algorithm in use for a PDCP layer of an LTE (Long Term Evolution) system.

BACKGROUND ART

FIG. 1 is a network structure of an LTE (Long Term Evolution) system, the related art mobile communication system. For the LTE system, which has evolved from the existing UMTS system, basic standardizations are ongoing in the 3GPP.

An LTE network can be divided into an E-UTRAN (Evolved UMTS Terrestrial Radio Access Network) and a CN (Core Network). An E-UMTS includes a terminal (or UE (User Equipment)), a base station (eNB (Evolved NodeB), and an access gateway (aGW). The access gateway may be divided into a part that handles processing of user traffic and a part that handles control traffic. In this case, the access gateway part that processes the user traffic and the access gateway part that processes the control traffic may communicate with each other by using a new interface. One or more cells may exist in a single eNB. An interface for transmitting user traffic or control traffic may be used between eNBs. The CN may include the access gateway and a node or the like for user registration of the UE. An interface for discriminating the E-UTRAN and the CN may be used.

FIG. 2 shows an exemplary structure of a control plane (C-plane) of a radio interface protocol between the UE and the E-UTRAN based on the 3GPP radio access network standards. FIG. 3 shows an exemplary structure of a user plane (U-plane) of the radio interface protocol between the UE and the E-UTRAN based on the 3GPP radio access network standards.

The structure of the radio interface protocol between the UE and the E-UTRAN will now be described with reference to FIGS. 2 and 3.

The radio interface protocol has horizontal layers comprising a physical layer, a data link layer, and a network layer, and has vertical planes comprising a user plane (U-plane) for transmitting data information and a control plane (C-plane) for transmitting control signals. The protocol layers in FIGS. 2 and 3 can be categorized as a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane of FIG. 2 and those of the radio protocol user plane in FIG. 3 will now be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common channel according to whether or not a channel is shared. Between different physical layers, namely, between a physical layer of a transmitting side (sender) and that of a receiving side (receiver), data is transferred via the physical channel.

The second layer includes various layers. First, a medium access control (MAC) layer serves to map various logical channels to various transport channels and performs logical channel multiplexing by mapping several logical channels to a single transport channel. The MAC layer is connected to an upper layer called a radio link control (RLC) layer by a logical channel. The logical channel is divided into a control channel that transmits information of the control plane and a traffic channel that transmits information of the user plane according to a type of transmitted information.

An RLC (Radio Resource Control) layer, the second layer, segments or concatenates data received from an upper layer to adjust the data size so as for a lower layer to suitably transmit the data to a radio interface. In addition, in order to guarantee various QoSs required by each radio bearer RB, the RLC layer provides three operation modes: a TM (Transparent Mode); a UM (Unacknowledged Mode); and an AM (Acknowledged Mode). In particular, the RLC layer operating in the AM (referred to as an 'AM RLC layer', hereinafter) performs a retransmission function through an automatic repeat and request (ARQ) function for a reliable data transmission.

A packet data convergence protocol (PDCP) layer of the second layer performs a function called header compression that reduces the size of a header of an IP packet, which is relatively large and includes unnecessary control information, in order to efficiently transmit the IP packet such as an IPv4 or IPv6 in a radio interface having a narrow bandwidth. The header compression increases a transmission efficiency on a radio interface by allowing the header part of the data to transmit only the necessary information.

The RRC layer located at the lowermost portion of the third layer is defined only in the control plane, and controls a logical channel, a transport channel and a physical channel in relation to configuration, reconfiguration, and the release of radio bearers (RBs). Here, the RBs refer to a logical path provided by the first and second layers of the radio protocol for data transmission between the UE and the UTRAN. In general, the configuration of the RB refers to the process of stipulating the characteristics of a radio protocol layer and a channel required for providing a particular data service, and setting the respective detailed parameters and operation methods.

Hereinafter, the PDCP layer will now be described in detail. The PDCP layer is upwardly connected with the RRC layer or a user application, and downwardly connected with the RLC layer. In FIG. 4, the left side shows the structure of functions of the transmitting PDCP entity and the right side shows the structure of functions of receiving PDCP entity. The left transmitting side structure shows operations applied to a PDCP SDU when the PDCP layer receives the PDCP SDU from an upper entity, and the right receiving side structure shows operations applied to a PDCP PDU when the PDCP layer receives the PDCP PDU from a lower entity.

The PDCP are used for both the user plane and the control plane, and some functions of the PDCP are selectively applied according to a used plane. Namely, as shown in FIG. 4, the header compression function is applied only to data of the user plane, while an integrity protection function is applied only to data of the control plane.

A data processing procedure performed by the transmitting PDCP entity at the left side in FIG. 4 will now be described.

S1: The PDCP layer assigns a sequence number to a received PDCP SDU.

S2: If an established RB is an RB of a user plane, the PDCP layer performs header compression on the PDCP SDU.

S3: If the established RB is an RB of the control plane, the PDCP layer performs integrity protection operation on the PDCP SDU.

S4: The PDCP layer performs ciphering on data blocks generated according to the results of the step S2 or S3.

S5: The PDCP layer configures a PDCP PDU by attaching a proper header to the ciphered data blocks, and delivers the configured PDCP PDU to the RLC layer.

A data processing procedure performed by the receiving PDCP entity at the right side in FIG. 4 will now be described.

S6: The PDCP layer removes the header of the received PDCP PDU.

S7: The PDCP layer performs deciphering on the header-removed PDCP PDU.

S8: If the established RB is an RB of the user plane, the PDCP layer performs header decompression on the deciphered PDCP PDU.

S9: If the established RB is an RB of the control plane, the PDCP layer performs an integrity verification operation on the deciphered PDCP PDU.

S10: The PDCP layer delivers data blocks, namely, PDCP SDUs, which have been received through step S8 or S9, to an upper layer. If the established RB is an RB of the user plane, the PDCP layer performs reordering as necessary, and delivers the same to an upper layer.

The header compression performed by the PDCP layer will now be described. The header compression is reducing the size of a header based on the fact that an IP header of each IP packet belonging to the same packet stream is not mostly changed. Unchanged fields are stored in the form of context in a compressor of the transmitting side and in a decompressor of the receiving side, and when context is formed, only changed fields are transmitted to thereby reduce the overhead of the IP header. At an initial stage of the header compression, the compressor transmits a full header packet to form context with respect to a corresponding packet stream, so there is no gain with the header compression. But, after the context is formed in the decompressor, the compressor can transmit only a compressed header packet, so its gain is remarkably increased.

An ROHC (Robust Header Compression), a typical header compression scheme used in the LTE system, is used to reduce header information of a real time packet such as an RTP (Real-time Transport Protocol)/UDP (User Diagram Protocol)/IP (Internet Protocol). Here, the RTP/UDP/IP packet refers to a packet with relevant headers which have been added as data from an upper layer passes through an RTP, a UDP and an IP. It includes various header information required for the data to be transferred to a destination via the Internet and recovered. In general, as for the header size of the RTP/UDP/IP packet, the IPv4 (IP version 4) has a header size of 40 bytes and the IPv6 has a header size of 60 bytes. When the headers are compressed by using the ROHC, the 40 or 60-byte headers are reduced to 1 to 3-byte headers, obtaining remarkable gains.

FIG. 5 shows a change in a header size of a packet formed according to the ROHC. Specifically, FIG. 5 comparatively shows the change in the header size of the general RTP/UDP/IP packet and the change in the header size with the ROHC applied. When a packet stream is transmitted first, because context is not formed yet in the compressor of the transmitting side and in the decompressor of the receiving side, so a full header is transmitted to form context. When the full header is transmitted to a degree, context is formed, and thus, a compressed header can be transmitted. In this respect, the context may be damaged due to a loss or the like of packets midway, so it is required to transmit the full header at proper intervals. In general, the full header includes additional information to form the context, so it is slightly larger than a normal header.

The security function performed by the PDCP layer will now be described. As described above, the security includes two functions of ciphering and integrity protection. In the both functions, codes that vary for each packet are generated, with which original data is ciphered or checked for its integrity.

The codes that vary for each packet are generated by using a PDCP SN (Sequence Number) added to a header of each PDCP PDU, and one of code generation factors is COUNT. The COUNT has a length of 32 bits, of which the least significant bit (LSB) includes a PDCP SN and the other remaining most significant bits (MSB) include an HFN (Hyper Frame Number). The length of the PDCP SN is 5, 7 or 12 bits, namely, different for each RB, so the length of the HFN is different for each case as 27, 25 or 20 bits.

Ciphering is performed in a way as shown in FIG. 6. The transmitting side generates ciphered data by covering a code which is changed for each packet, namely, MASK, on original data. Here, covering of the MASK refers to performing XOR on the original data and the MASK by bits. When the thusly ciphered data is received, the receiving side covers the MASK again on the ciphered data to decipher it. Here, the MASK has a length of 32 bits and is generated from various input factors. In particular, in order to generate a different value for each packet, COUNT is generated by using a PDCP sequence number different for every PDCP PDU, and the generated COUNT is used as one of MASK generation input factors. Besides the COUNT, the MASK generation input factors include a 'bearer', an ID value of a corresponding RB, a 'Direction' having an upward or downward value, a 'CK (Ciphering Key)' exchanged by the terminal and the network in establishing an RB, or the like.

In addition, the integrity protection is performed in a way as shown in FIG. 7. Like the ciphering process, in the integrity protection process, a code, namely, 'MAC-I (Message Authentication Code-Integrity)', by using a 'COUNT' using the PDCP SN, a 'Bearer', an ID value of an RB, a 'Direction' having an upward or downward value, an 'IK (Integrity Protection Key)' exchanged by the terminal and the network in establishing an RB, or the like. Here, a difference from the ciphering process as shown in FIG. 6 is that the generated 'MAC-I' is not XORed with original data but attached to a PDCP PDU as shown in FIG. 7. When the receiving side receives the MAC-1-attached PDCP PDU, it generates an XMAC-I by using the same input factor as that used in the transmitting side and compares it with the MAC-I attached to the PDCP PDU. If the two values (namely, XMAC-I and the MAC-I attached to the PDCP PDU) are identical, it is determined that data has integrity, whereas if the two values are different, it is determined that data has been changed midway.

For some reasons, the MASK or the MAC-I of the transmitting side and the receiving side may be changed to cause an error in ciphering or integrity protection. The main reason for the MASK or the MAC-I to be changed is because HFN, the MSB of the COUNT, is changed. This occurs when numerous PDCP SDU are lost. The reason is because the MSB of the COUNT is HFN and the LSB of the COUNT is SN and if the PDCP SN reaches a maximum value, it returns to zero (0) and one HFN, the MSB, is increased. Namely, if PDCP SDUs are lost as many as to wrap around a PDCP SN space, de-synchronization of HFN occurs. For another reason, there may be an error that cannot be found even with a CRC (Cyclic Redundancy Code) inspection at a lower layer, and in this case, if the PDCP SN value is not within a valid range, HFN de-synchronization may occur.

When the HFN de-synchronization occurs, security fails. Thus, although the receiving side receives data, it cannot restore the original data, causing a problem that the receiving side continuously discards received data.

With this problem arising, the RB of the user plane and the RB of the control plane will be separately described.

First, in case of the RB of the user plane, received PDCP PDUs are deciphered and subjected to header decompression. At this time, if the PDCP PDUs are deciphered with an erroneous MASK, an error occurs continuously in the process of header compression, so the receiving side continuously discards the received PDCP PDUs.

Second, in case of the RB of the control plane, received PDCP PDUS are deciphered and subjected to integrity verification. If the PDCP PDUs are deciphered with an erroneous MASK or compared with an erroneous XMAC-I, errors continuously occur in the process of integrity verification, so the receiving side continuously discards the received PDCP PDUs.

This problem arises because a function of detecting HFN de-synchronization is not currently provided. As a result, once HFN de-synchronization occurs, it cannot be recovered, and the received PDUs since then have an error and thus continuously discarded.

TECHNICAL GIST OF THE PRESENT INVENTION

Therefore, it is an object of the present invention to allow a receiving side PDCP entity to determine whether or not HFN de-synchronization, namely, a security failure, occurs by using particular conditions, and inform an RRC to re-establish an RB or reset a security configuration of a transmitting side or a receiving side by using a PDCP RESET process if the HFN de-synchronization occurs.

To achieve the above object, there is provided a method for detecting a security error in a mobile communication system, including: (A) counting the number of erroneous packets among one or more received packets; (B) comparing the number of counted erroneous packets with a reference value; and (C) determining a security failure if the number of counted erroneous packets reaches the reference value.

The step (A) may include: receiving at least one packet transmitted from a transmitting side; removing a header of the at least one received packet; deciphering on the at least one header-removed packet; determining an error of a security failure of the at least one received packet by performing a process of deciphering a compressed header or performing an integrity verification process from the at least one deciphered packet; and increasing a count value if there is a packet determined to have an error of the security failure.

The one or more received packets may be data of a user plane or data of a control plane.

The method may further include: (D) if the number of counted erroneous packets reaches the reference value so as to be determined as the security failure, performing a recovery process of a security configuration.

The recovery process may include performing of a reset procedure of a PDCP layer.

The recovery process may include notifying to an RRC layer.

The RRC layer may re-establish an RB (Radio Bearer), re-establish an RRC connection or reset a security configuration with respect to a particular RB.

The step (A) is performed in a header decompression process of a PDCP (Packet Data Convergence Protocol) layer or in an integrity verification process of the PDCP layer.

The reference value may be different according to an RB.

To achieve the above object, there is also provided a method for detecting a security error in a mobile communication system, including: receiving at least one packet; performing integrity verification or header decompression on the at least one received packet; identifying an error on the at least one received packet while performing the integrity verification or header decompression; reporting the identified error to an RRC layer, if the at least one received packet is identified to have an error; and performing re-establishment by the RRC layer upon receiving the identified error.

The re-establishment may include at least one of RB re-establishment and re-establishment of a PDCP layer.

The re-establishment may be a re-establishment of an RRC connection.

The integrity verification may use XMAC-I, and the header decompression may use context.

The re-establishment of the PDCP layer may be a RESET of the PDCP layer.

The present invention provides the method for effectively detecting a security failure as it occurs at the PDCP layer of a receiving side, so any further data loss and a resultant waste of radio resources can be prevented.

MODE FOR CARRYING OUT THE PREFERRED EMBODIMENTS

Figure 1:
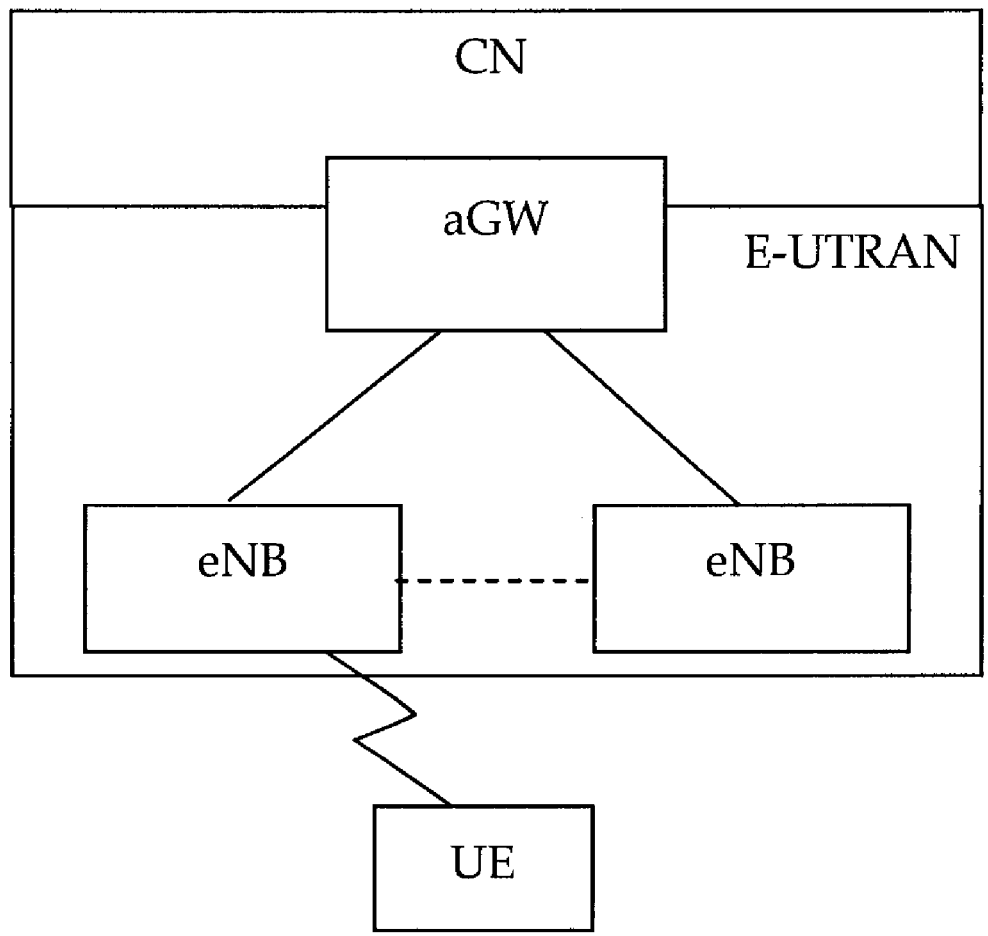
FIG. 1 shows a network structure of a Long Term Evolution (LTE), the related art mobile communication system.
Figure 2:
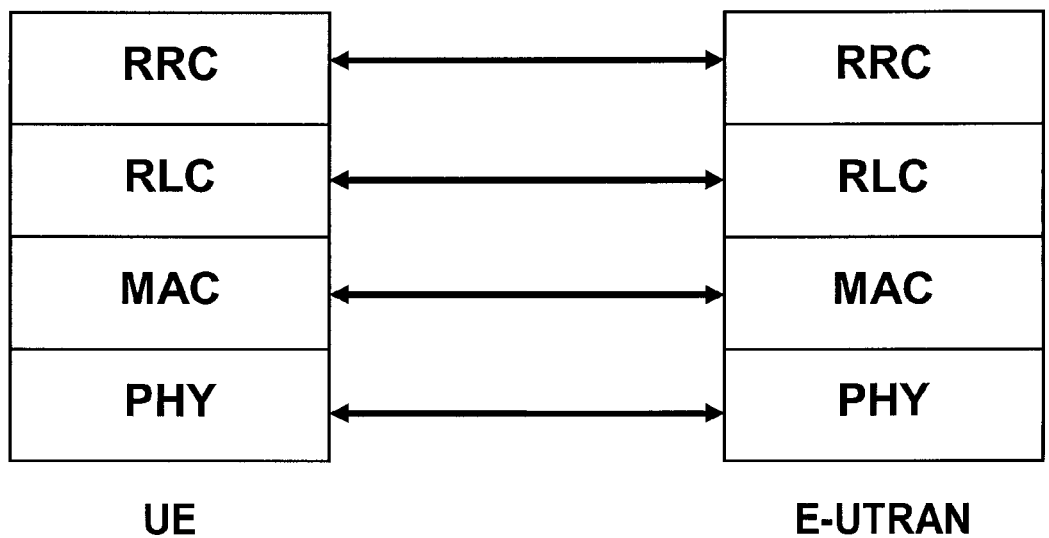
FIG. 2 shows the architecture of a control plane of a radio interface protocol between a terminal and an Evolved-UMTS Terrestrial Radio Access Network (UTRAN) based on 3GPP radio access network standards.
Figure 3:
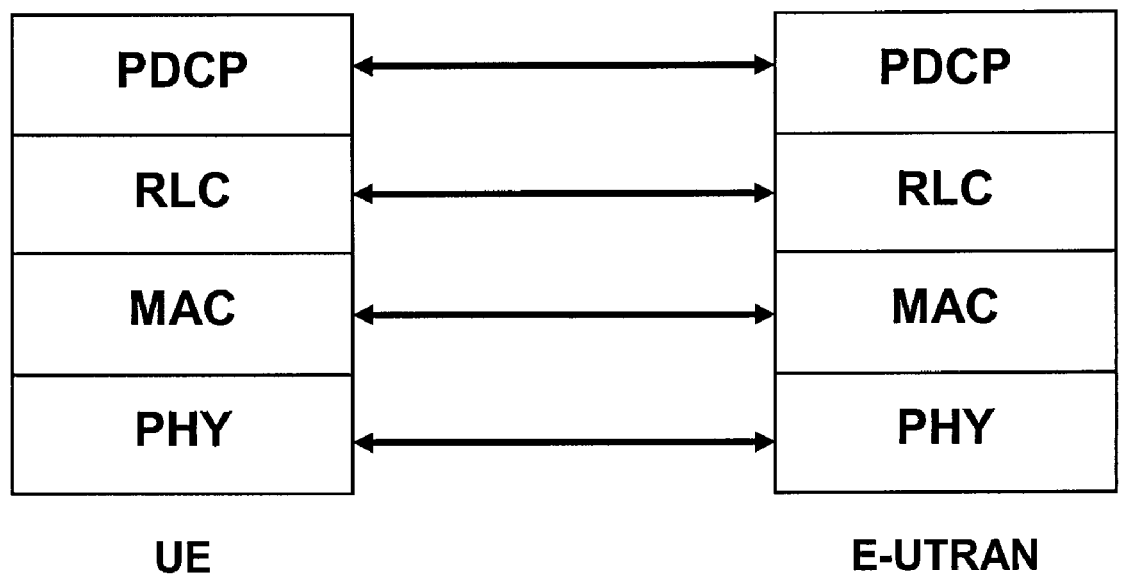
FIG. 3 shows the architecture of a user plane of the radio interface protocol between the terminal and the Evolved-UMTS Terrestrial Radio Access Network (UTRAN) based on 3GPP radio access network standards.
Figure 4:
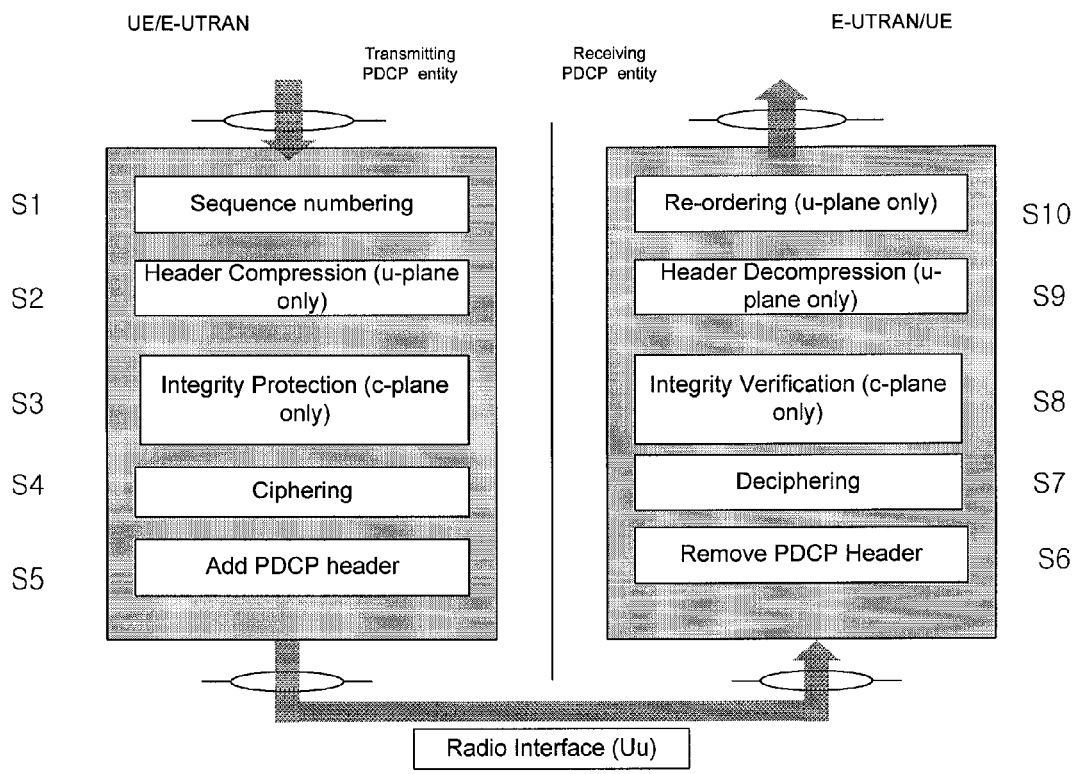
FIG. 4 shows a function structure of a PDCP layer.
Figure 5:
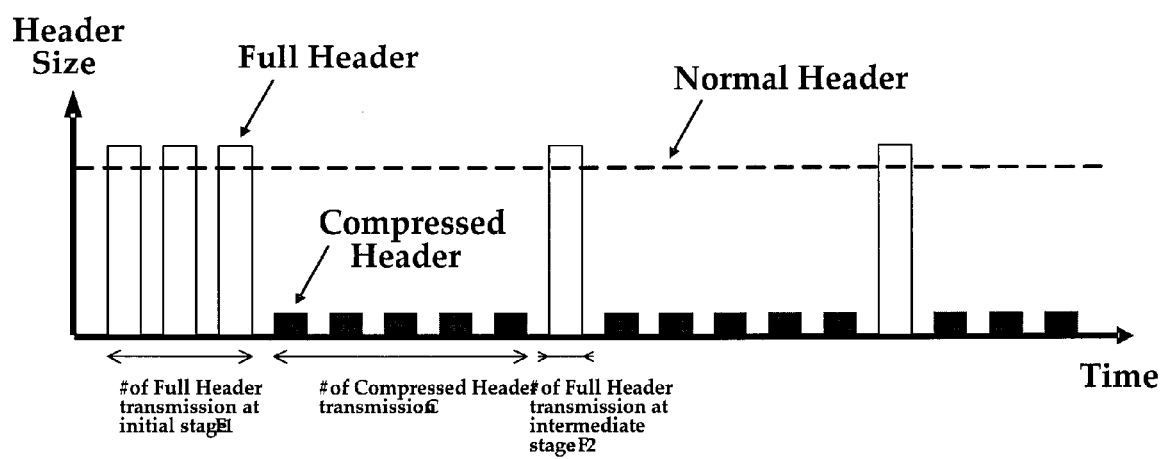
FIG. 5 shows a change in a header size of a packet formed according to an ROHC.
Figure 6:
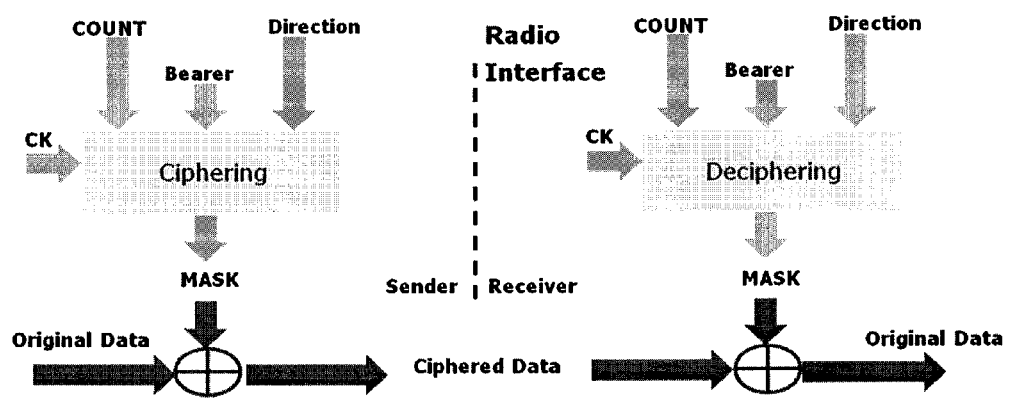
FIG. 6 shows a ciphering method.
Figure 7:
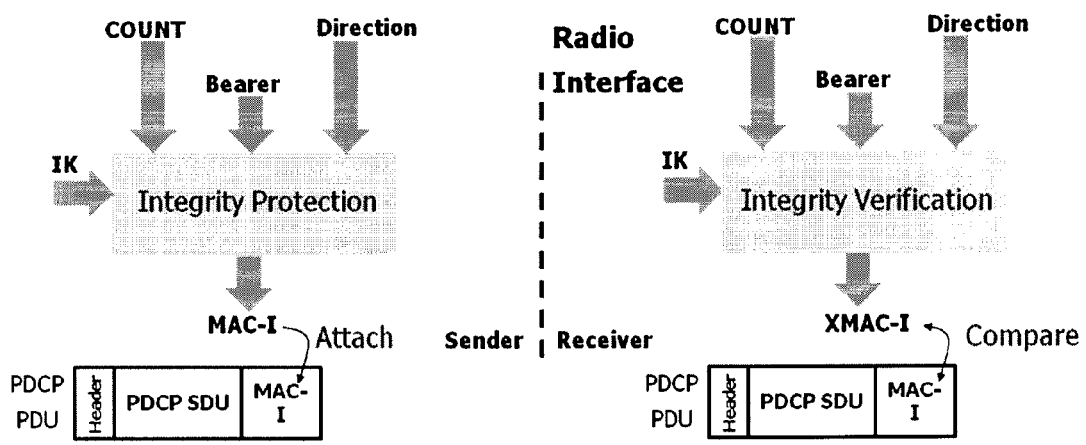
FIG. 7 shows an integrity protection method.

The present invention is applied to a mobile telecommunications system and, more particularly, to an Evolved Universal Mobile Telecommunications System (E-UMTS) that has evolved from UMTS. However, without being limited thereto, the present invention may be also applied to any mobile telecommunications systems and communication protocols to which technical features of the present invention is applicable.

The present invention may be modified variably and may have various embodiments, particular ones of which will be illustrated in drawings and described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned to be "connected" to or "accessing" another component, this may mean that it is directly connected to or accessing the other component, but it is to be understood that another component may exist in-between. On the other hand, when a component is mentioned to be "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Embodiments of the present invention will be described below in detail with reference to the accompanying drawings, where those components are rendered the same reference number that are the same or are in correspondence, regardless of the figure number, and redundant explanations are omitted.

Terms in use in the present invention will be described as follows.

A security failure refers to a phenomenon that an MASK (in case of U-plane) or a MAC-I (in case of C-plane) of a transmitting side or a receiving side is changed to cause an error in ciphering or integrity protection, resulting in an HFN de-synchronization.

A security configuration refers to ciphering and integrity protection, and ciphering herein is performed on a packet (data) of the user plane and the integrity protection is performed on a packet (data) of the control plane.

The present invention is based upon such recognition that, currently, a PDCP layer does not provide a function for detecting an HFN de-synchronization. Thus, the present invention addresses the problem that once an HFN de-synchronization occurs, it cannot be recovered, so all the PDUs received by a receiving side have an error, and thus, the receiving side continuously discards the received PDUs.

A basic concept of the present invention is that 1) conditions for determining a security failure are defined, 2) a receiving side PDCP entity determines whether or not an HFN de-synchronization, namely, a security failure, has occurred by using the particular conditions (i.e., the conditions for determining the security failure), 3) if it is determined that a security failure has occurred, the receiving side PDCP entity informs an RRC layer to re-establish an RB or perform a PDCP RESET procedure, 4) to thereby reset a security configuration of the transmitting side and the receiving side.

The determining conditions of the security failure according to the present invention will now be described in detail.

The determining conditions of the security failure differ according to whether a corresponding RB belongs to the user plane or the control plane.

First, the determining conditions of the security failure in case of the U-plane RB will now be described.

The receiving side performs header decompression on deciphered data. If deciphering is not properly performed, CRC error occurs during header decompression, which results in the failure of the header decompression. Thus, the number of packets failed for header decompression works as a ground for the HFN de-synchronization. Namely, the PDCP counts the number of erroneous packets during the header decompression with respect to the U-plane RB, and if the number of erroneous packets is larger than a reference value (or threshold value), the PDCP layer determines that there is a problem of a security and performs a recovery process of the security failure. To this end, the receiving side PDCP entity uses a variable (or counter) for counting the number of CRC-error packets during the header decompression, and increases the value of the variable whenever an error occurs in a packet. Thereafter, when the variable reaches to a predetermined reference value (threshold value), the PDCP determines that there is a problem in the security configuration. Meanwhile, the reference value may be informed to the transmitting side RRC layer (namely, UE RRC layer) by the receiving side RRC layer (namely, eNB RRC layer) in RB setup, and then to the transmitting side PDCP entity (namely, UE PDCP entity) by the transmitting side RRC layer (UE RRC layer). The reference value may be previously determined as a particular value and have a different value according to an RB. The value of the variable (or counter) for counting the erroneous packets may be increased whenever errors occur at packets (e.g., if errors occur discontinuously), or may be increased only when errors occur at packets continuously.

Figure 8:
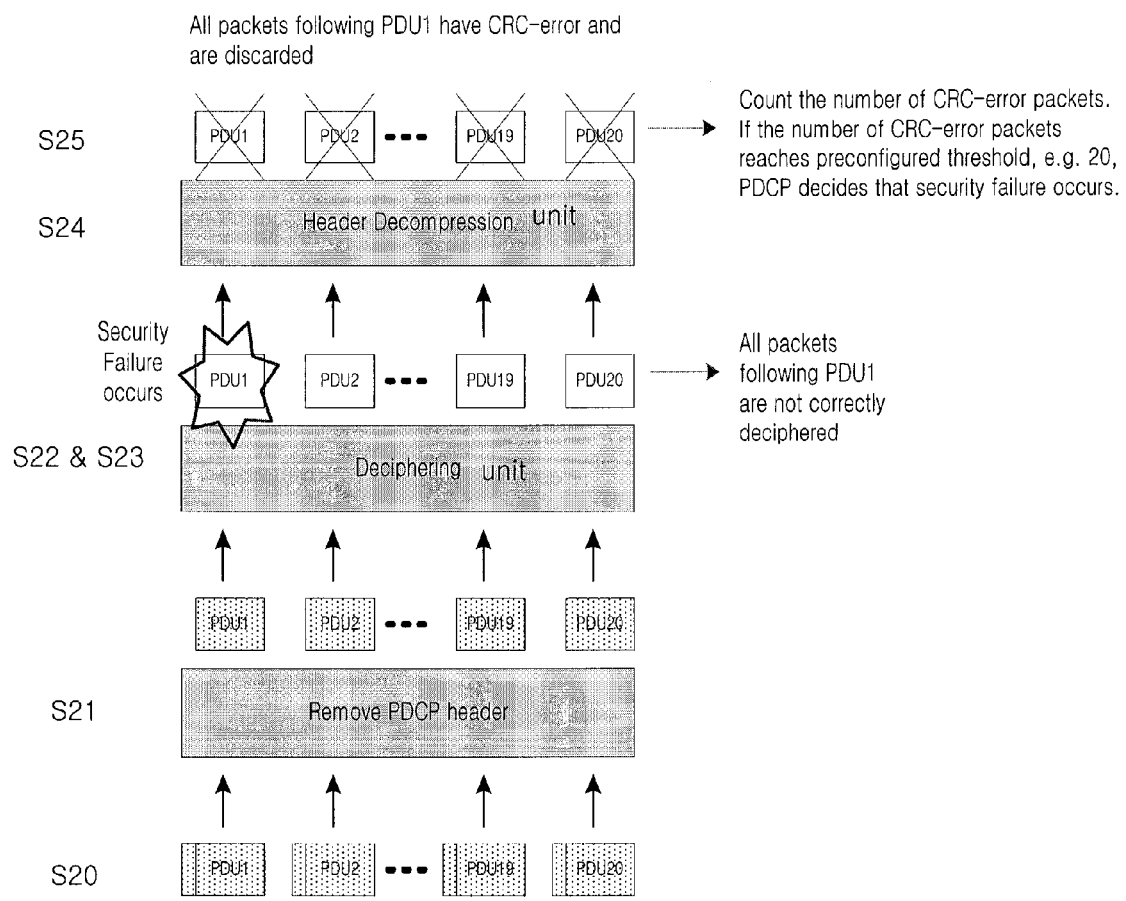
FIG. 8 is a block diagram showing the process of determining a security failure with respect to a user plane RB according to an embodiment of the present invention.

FIG. 8 is a block diagram showing the process of determining a security failure by the receiving side PDCP entity with respect to the user plane RB according to an embodiment of the present invention. The process of determining a security failure in case of the U-plane RB will now be described in detail.

S20: The receiving side PDCP entity receives PDCP PDUS of PDU1~PDU20 from a lower layer, namely, the RLC.

S21: The receiving side PDCP entity removes a header of the received PDUs and delivers them to a deciphering unit.

S22: The deciphering unit of the receiving side PDCP entity performs deciphering on the header-removed PDUs. If a security failure occurs at a PDU1, namely, if an HFN de-synchronization occurs, the PDU1 and all the other subsequent PDUs (namely, PDU2~PDU20) are not properly deciphered.

S23: However, the receiving side PDCP entity does not recognize the fact that the packets (namely, PDU1~PDU20) have not been deciphered properly, and delivers them to a header decompression unit.

S24: The header decompression unit performs header decompression on the received packets, but all of them have an error. The identified error can be determined based on CRC values of the headers.

S25: The receiving side PDCP entity counts the number of packets to which an error has occurred during header decompression. If the number of counted erroneous packets reaches (namely, which is larger than) a predefined reference value (i.e., a threshold value that may be, for example, 20), the receiving side PDCP entity determines that there is an error in the security configuration.

Namely, in the embodiment as shown in FIG. 8, first, when the receiving side PDCP entity performs header decompression on the received packet, it determines an error based on a CRC value of the header. Second, the receiving side PDCP entity counts the number of erroneous packets. Third, if the number of erroneous packets reaches the reference value, the receiving side PDCP entity determines that a security failure has occurred. Upon determining the security failure, the receiving side PDCP entity quickly performs a process of recovering the security failure in order to prevent a possible further data loss and a waste of radio resources. The recovery process may be performed such that, for example, the receiving side RRC layer informs the terminal about the error of the security failure, so that the terminal can cut off its connection to the network and establishes an RRC connection again from the beginning. Alternatively, the RRC layer may re-establish an RB or set up again a security configuration with respect to a particular RB between the terminal (UE) and the network.

First, the conditions for determining a security failure in case of the C-plane RB will be described as follows.

In case of the C-plane RB, header decompression is not performed, and instead, the integrity verification is performed. Thus, the security failure should be determined based on a different basis from that of the U-plane RB. In performing integrity verification, a MAC-I value included in a PDU and an XMAC-I value generated by the receiving side PDCP entity itself are compared. If the two values are different, it is determined that the integrity verification fails and the packets received by the receiving side PDCP entity are discarded. Thus, in the present invention, with respect to the C-plane RB, if packets more than a certain number have an error in performing the integrity verification, it is determined as a security failure, and a process of recovering the security failure is performed. To this end, in performing the integrity verification, the receiving side PDCP entity counts the number of errors, namely, the number of cases where the MAC-I value included in the PDU and the XMAC-I generated by the receiving side PDCP entity itself are different. In other words, the receiving side PDCP entity uses a variable (counter) for counting the number of corresponding packets having different values (the MAC-I value included in the PDUs and the XMAC-1 value generated by the receiving side PDCP entity itself). That is, whenever errors occur at packets, the receiving side PDCP entity increase the value of the variable, and when the variable reaches a predetermined reference value (threshold value), the receiving side PDCP entity determines that there is a problem in the security configuration. Meanwhile, the reference value may be informed to the transmitting side RRC layer (namely, UE RRC_layer) by the receiving side RRC layer (namely, eNB RRC layer) in RB setup, and then to the transmitting side PDCP entity (namely, UE PDCP entity) by the transmitting side RRC layer (UE RRC layer). The reference value may be previously determined as a particular value and have a different value according to an RB. The value of the variable (or counter) for counting the erroneous packets may be increased whenever errors occur at packets (e.g., if errors occur discontinuously), or may be increased only when errors occur at packets continuously.

Figure 9:
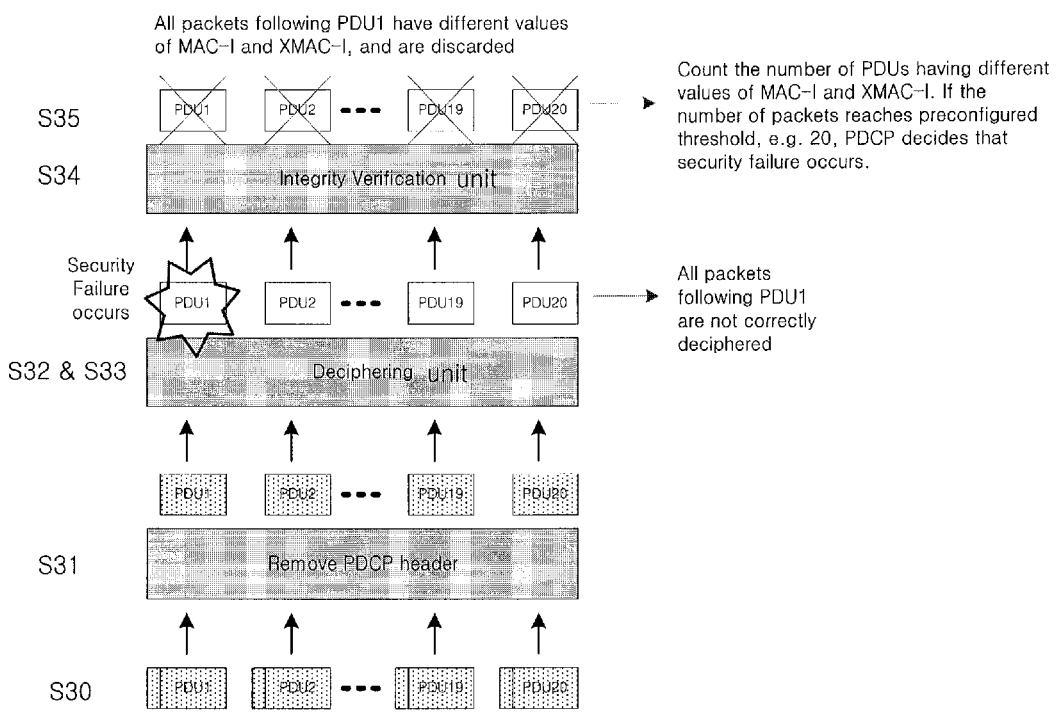
FIG. 9 is a block diagram showing the process of determining a security failure with respect to a control plane RB according to an embodiment of the present invention.

FIG. 9 is a block diagram showing the process of determining a security failure by the receiving side PDCP entity with respect to the control plane RB according to an embodiment of the present invention. The process of determining a security failure with respect to the C-plane RB will now be described in detail.

S30: The receiving side PDCP entity receives PDCP PDUS of PDU1~PDU20 from a lower layer, namely, the RLC layer.

S31: The receiving side PDCP entity removes headers of the received PDUs and delivers them to the deciphering unit.

S32: The receiving side PDCP entity performs deciphering on the header-removed PDUs. If a security failure occurs at a PDU1, namely, if an HFN de-synchronization occurs, the PDU1 and all the other subsequent PDUs (namely, PDU2~PDU20) are not properly deciphered.

S33: However, the receiving side PDCP entity does not recognize the fact that the packets (namely, PDU1~PDU20) have not been deciphered properly, and delivers them to an integrity verification unit.

S34: The integrity verification unit performs integrity verification on the received packets (namely, PDU1~PDU20), but all of them have an error. The identified error can be determined by comparing the MAC-I value included in the PDUs and the XMAC-I value generated by the receiving side PDCP entity itself.

S35: The receiving side PDCP entity counts the number of packets to which an error has occurred during integrity verification. If the number of counted erroneous packets reaches a predefined reference value (which may be, for example, 20), the receiving side PDCP entity determines that there is an error in the security configuration.

The embodiment in FIG. 9 shows the case where the error occurs during the deciphering process. But, actually, an error may occur during the integrity verification process. In this case, the follow-up processing procedure is the same as described above. For example, if deciphering are successfully performed on all the packets but a PDU 1 has an error because of an erroneous integrity verification parameter, all of the subsequent packets would have an error. Thus, in any cases, the number of erroneous packets are counted in the integrity verification to determine whether or not a security failure has occurred.

When the receiving side PDCP entity determines a security failure, the receiving side PDCP entity quickly performs a process of recovering the security failure in order to prevent a possible further data loss and a waste of radio resources. The recovery process may be performed such that, for example, the receiving side RRC layer informs the terminal about the error of the security failure, so that the terminal can cut off its connection to the network and establishes an RRC connection again from the beginning. Alternatively, the RRC layer may re-establish an RB or set up again a security configuration with respect to a particular RB between the terminal (UE) and the network.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A method for reporting a security failure in a mobile communication system, the method comprising:
    receiving at least one data unit in a packet data convergence protocol (PDCP) layer of a receiver;
    performing integrity verification on the at least one data unit in the PDCP layer;
    identifying whether a security failure exists with regard to the at least one data unit while performing the integrity verification; and
    reporting the security failure to a radio resource control (RRC) layer of the receiver if the security failure is identified to exist with regard to the at least one data unit, wherein the RRC layer performs a re-establishment procedure upon receiving the security failure report,
    wherein the re-establishment procedure comprises at least re-establishing a radio bearer (RB), re-establishing an RRC connection, resetting a security configuration with respect to a particular RB, or re-establishing the PDCP layer.

2. The method of claim 1, wherein re-establishing the PDCP layer comprises resetting the PDCP layer.

3. The method of claim 1, wherein identifying whether the security failure exists with regard to the at least one data unit while performing the integrity verification comprises:
    counting a number of error data units among the at least one data unit received;
    comparing the number of error data units counted to a reference value; and
    determining the security failure exists if the number of error data units counted reaches the reference value.

4. The method of claim 3, wherein counting the number of error data units among the at least one data unit received comprises:
    removing a header of the at least one data unit received;
    deciphering the header-removed at least one data unit: and
    increasing a counter value representing the number of error data units when an error data unit is determined to exist, wherein the counter value is compared to the reference value to determine if the security failure exists.

5. The method of claim 3, further comprising performing a security configuration recovery process if the number of error data units counted reaches the reference value.

6. The method of claim 5, wherein the security configuration recovery process comprises performing a reset procedure of the PDCP layer.

7. The method of claim 3, wherein the error data units are in a consecutive order.

8. The method of claim 3, wherein the reference value differs according to a radio bearer (RB).

9. The method of claim 3, wherein a data unit error is determined when a message authentication code-integrity (MAC-I) value of the at least one data unit received is different from an expected message authentication code-integrity (XMAC-I) value generated by the PDCP layer.

10. The method of claim 1, further comprising discarding the at least one data unit if the security failure is identified to exist with regard to the at least one data unit.

11. The method of claim 1, wherein the at least one data unit comprises control plane data.

12. A packet data convergence protocol (PDCP) entity of a receiver in a mobile communication system, the PDCP entity comprising:
    a header removing module for removing a header of at least one data unit received;
    a deciphering module for deciphering the header-removed at least one data unit; and
    an integrity verification module for performing integrity verification on the at least one data unit, and for identifying whether a security failure exists with regard to the at least one data unit while performing the integrity verification,
    wherein the security failure is reported to a radio resource control (RRC) layer of the receiver if the integrity verification module identifies the existence of the security failure with regard to the at least one data unit, wherein the RRC layer performs a re-establishment procedure upon receiving the security failure report,
    wherein the re-establishment procedure comprises at least re-establishing a radio bearer (RB), re-establishing an RRC connection, resetting a security configuration with respect to a particular RB, or re-establishing the PDCP layer.

13. The PDCP entity of claim 12, wherein the at least one data unit is discarded if the integrity verification module identifies the existence of the security failure with regard to the at least one data unit.

* * * * *